(12) United States Patent
Lee

(10) Patent No.: US 11,036,263 B2
(45) Date of Patent: Jun. 15, 2021

(54) DISPLAY DEVICE HAVING AN ANISOTROPIC CONDUCTIVE FILM

(71) Applicant: SAMSUNG DISPLAY CO., LTD., Yongin-si (KR)

(72) Inventor: Jong Yoon Lee, Ansan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/821,527

(22) Filed: Mar. 17, 2020

(65) Prior Publication Data
US 2020/0348736 A1 Nov. 5, 2020

(30) Foreign Application Priority Data

May 2, 2019 (KR) .................. 10-2019-0051390

(51) Int. Cl.
| | | |
|---|---|---|
| *G06F 1/18* | (2006.01) | |
| *G06F 1/16* | (2006.01) | |
| *G02B 1/16* | (2015.01) | |
| *G02B 1/04* | (2006.01) | |

(52) U.S. Cl.
CPC .............. *G06F 1/189* (2013.01); *G02B 1/04* (2013.01); *G02B 1/16* (2015.01); *G06F 1/1609* (2013.01); *G06F 1/1652* (2013.01)

(58) Field of Classification Search
CPC ........ H05K 1/147; H05K 1/148; H05K 1/028; H05K 1/0393; H05K 1/14; G06F 1/189; G06F 1/1609; G06F 1/1652; G02B 1/16; G02B 1/04; H01L 27/124; H01L 27/3297
See application file for complete search history.

(56) References Cited

U.S. PATENT DOCUMENTS

| | | | | |
|---|---|---|---|---|
| 2014/0118969 A1* | 5/2014 | Lee | ...................... | H01L 23/552 361/749 |
| 2014/0124803 A1* | 5/2014 | Kwack | .................... | H01L 24/06 257/91 |
| 2014/0355226 A1* | 12/2014 | Kim | ...................... | H05K 3/361 361/749 |

(Continued)

FOREIGN PATENT DOCUMENTS

| | | |
|---|---|---|
| KR | 10-0868240 | 11/2008 |
| KR | 10-2010-0102835 | 9/2010 |
| KR | 10-2017-0065470 | 6/2017 |

*Primary Examiner* — Timothy J Thompson
*Assistant Examiner* — Amol H Patel
(74) *Attorney, Agent, or Firm* — F. Chau & Associates, LLC

(57) ABSTRACT

A display device includes a display panel in which signal wirings are arranged, and a first circuit board attached to the display panel. The first circuit board includes a lead wiring layer including first lead wirings, an organic protective layer on the lead wiring layer and partially exposing the first lead wirings, and an anisotropic conductive film between the lead wiring layer and the organic protective layer and electrically connecting the exposed first lead wirings to the signal wirings. A side surface of the organic protective layer, facing a side surface of the display panel, is spaced apart from the side surface of the display panel, and the anisotropic conductive film is disposed in a space between the exposed first lead wirings and the side surface of the organic protective layer and a space between the exposed first lead wirings and the side surface of the display panel.

20 Claims, 19 Drawing Sheets

(56) References Cited

U.S. PATENT DOCUMENTS

| | | | | |
|---|---|---|---|---|
| 2017/0287814 | A1* | 10/2017 | Kim | H01L 23/29 |
| 2019/0306994 | A1* | 10/2019 | Taguchi | G02F 1/13452 |
| 2020/0137888 | A1* | 4/2020 | Liu | H05K 1/147 |
| 2020/0236784 | A1* | 7/2020 | Muraoka | H05K 1/113 |

* cited by examiner

DISPLAY DEVICE HAVING AN ANISOTROPIC CONDUCTIVE FILM

CROSS-REFERENCE TO RELATED APPLICATION

This application claims priority under 35 U.S.C. § 119 to Korean Patent Application No 10-2019-0051390, filed on May 2, 2019 in the Korean Intellectual Property Office, the disclosure of which is incorporated by reference herein in its entirety.

TECHNICAL FIELD

Exemplary embodiments of the inventive concept relate to a display device, and more particularly, to a display device having an anisotropic conductive film.

DISCUSSION OF RELATED ART

A display device is a device for visually displaying data. Such a display device includes a substrate divided into a display area and a non-display area. A plurality of pixels are arranged on a substrate in the display area, and a plurality of pads are arranged on the substrate in the non-display area. The plurality of pads are connected with a flexible film (e.g., chip-on-film (COF) film) mounted with a driving integrated circuit or the like to transmit driving signals to the plurality of pixels.

The flexible film includes a plurality of lead wirings connected with the plurality of pads, and each of the plurality of lead wirings may be bonded to a separate pad. When the lead wiring and the pad are bonded, an anisotropic conductive film (ACF) may be interposed between the lead wiring and the pad.

However, when the ACF is disposed on the pad and then the lead wiring is bonded, moisture permeation may proceed through an exposed region of the lead wiring, causing corrosion of the lead wiring.

SUMMARY

According to an exemplary embodiment of the inventive concept, a display device includes a display panel including a display area and a pad area which is disposed around the display area and in which a plurality of signal wirings are arranged, and a first circuit board attached to the pad area of the display panel. The first circuit board includes a base film, a lead wiring layer disposed on the base film and including a plurality of first lead wirings connected to the plurality of signal wirings, an organic protective layer disposed on the lead wiring layer and partially exposing the plurality of first lead wirings, and an anisotropic conductive film disposed between the lead wiring layer and the organic protective layer and electrically connecting the exposed plurality of first lead wirings to the plurality of signal wirings. A first side surface of the organic protective layer, facing one side surface of the display panel, is spaced apart from the one side surface of the display panel, and from a plan view, the anisotropic conductive film is disposed in a space between the exposed plurality of first lead wirings and the first side surface of the organic protective layer and a space between the exposed plurality of first lead wirings and the one side surface of the display panel.

The anisotropic conductive film may be in contact with the exposed plurality of first lead wirings and the plurality of signal wirings.

The plurality of first lead wirings may be arranged to be separated from one another, and the anisotropic conductive film is disposed between adjacent first lead wirings among the plurality of first lead wirings.

The anisotropic conductive film may be in contact with a side surface of the adjacent first lead wirings.

The anisotropic conductive film may be in contact with the base film and the display panel in an area not overlapping the plurality of first lead wirings.

A thickness of the anisotropic conductive film in an area contacting the base film may be greater than a thickness of the anisotropic conductive film disposed in the space between the exposed plurality of first lead wirings and the first side surface of the organic protective layer.

A thickness of the anisotropic conductive film disposed between the plurality of signal wirings and the plurality of first lead wirings may be smaller than a thickness of the anisotropic conductive film disposed in the space between the exposed plurality of first lead wirings and the first side surface of the organic protective layer.

The first circuit board may further include a lead bonding layer disposed between the lead wiring layer and the organic protective layer, and side surfaces of the lead bonding layer may be aligned with side surfaces of the organic protective layer in a thickness direction.

The organic protective layer may include a second side surface facing the first side surface, and the anisotropic conductive film may include a third side surface and a fourth side surface facing the third side surface, and a distance between the first side surface and the second side surface of the organic protective layer may be less than a distance between the third side surface and the fourth side surface of the anisotropic conductive film.

The organic protective layer may include a second side surface facing the first side surface, the anisotropic conductive film may include a third side surface and a fourth surface facing the third side surface, the first side surface of the organic protective layer may be located between the third side surface and the fourth side surface of the anisotropic conductive film, and the second side surface of the organic protective layer may be located between the fourth side surface of the anisotropic conductive film and a side surface of the first circuit board.

The first circuit board may further include a driving integrated circuit disposed on the organic protective layer, and a first via hole overlapping the driving integrated circuit and penetrating the organic protective layer and the anisotropic conductive film.

The driving integrated circuit may be electrically connected to the plurality of first lead wirings through the first via hole.

The first circuit board may further include a second via hole overlapping the driving integrated circuit in a thickness direction, penetrating the organic protective layer and the anisotropic conductive film, and spaced apart from the first via hole.

The lead wiring layer may further include a plurality of second lead wirings electrically connected to the driving integrated circuit through the second via hole.

The display device may further include a second circuit board attached to the first circuit board, the organic protective layer may partially expose the plurality of second lead wirings, and the anisotropic conductive film may be disposed between the exposed plurality of second lead wirings and the second circuit board to electrically connect the exposed plurality of second lead wirings to the second circuit board.

The display device may further include a panel lower sheet, the first circuit board may be bent in a direction opposite to a display surface of the display panel, and one end of the first circuit board and the second circuit board may overlap the panel lower sheet.

The organic protective layer may include protrusion patterns disposed between adjacent first lead wirings among the plurality of first lead wirings in a plan view, and the protrusion patterns may be spaced apart from one another with the adjacent first lead wirings therebetween.

The first circuit board may further include a waterproof member disposed on the anisotropic conductive film, and the waterproof member may be disposed in a space between the first side surface of the organic protective layer and the one side surface of the display panel overlapping the exposed plurality of first lead wirings.

According to an exemplary embodiment of the inventive concept, a printed circuit board includes a base film, a lead wiring layer disposed on the base film and including a plurality of lead wirings, an organic protective layer disposed on the lead wiring layer and partially exposing the plurality of lead wirings, and an anisotropic conductive film disposed between the lead wiring layer and the organic protective layer. The organic protective layer includes a first side surface aligned with the exposed plurality of lead wirings, and a second side surface facing the first side surface, the anisotropic conductive film includes a third side surface and a fourth side surface facing the third side surface, a distance between the third side surface and the fourth side surface is greater than a distance between the first side surface and the second side surface, and the anisotropic conductive film covers the exposed plurality of lead wirings.

The plurality of lead wirings may be separated from one another, the anisotropic conductive film may be disposed between adjacent lead wirings among the plurality of lead wirings, and the anisotropic conductive film may be in contact with a side surface of the adjacent lead wiring.

According to an exemplary embodiment of the inventive concept, a display device, includes a display panel including a display substrate and a plurality of signal wirings, a first circuit board including a base film, a lead wiring layer disposed on the base film, an anisotropic conductive film disposed on the lead wiring layer, and an organic protective layer disposed on the anisotropic conductive film, a panel lower sheet disposed on the display substrate, and a second circuit board disposed on the panel lower sheet. A first end of the anisotropic conductive film is in contact with the plurality of the signal wirings and a second end of the anisotropic conductive film is in contact with the second circuit board. The anisotropic conductive film is disposed in a space between a first side surface of the organic protective layer and a side surface of the display panel, and the anisotropic conductive film is disposed in a space between a second side surface of the organic protective layer and a side surface of the second circuit board.

BRIEF DESCRIPTION OF THE DRAWINGS

The above and other aspects and features of the inventive concept will become more apparent by describing in detail exemplary embodiments thereof with reference to the attached drawings.

DETAILED DESCRIPTION OF THE EMBODIMENTS

Figure 1:
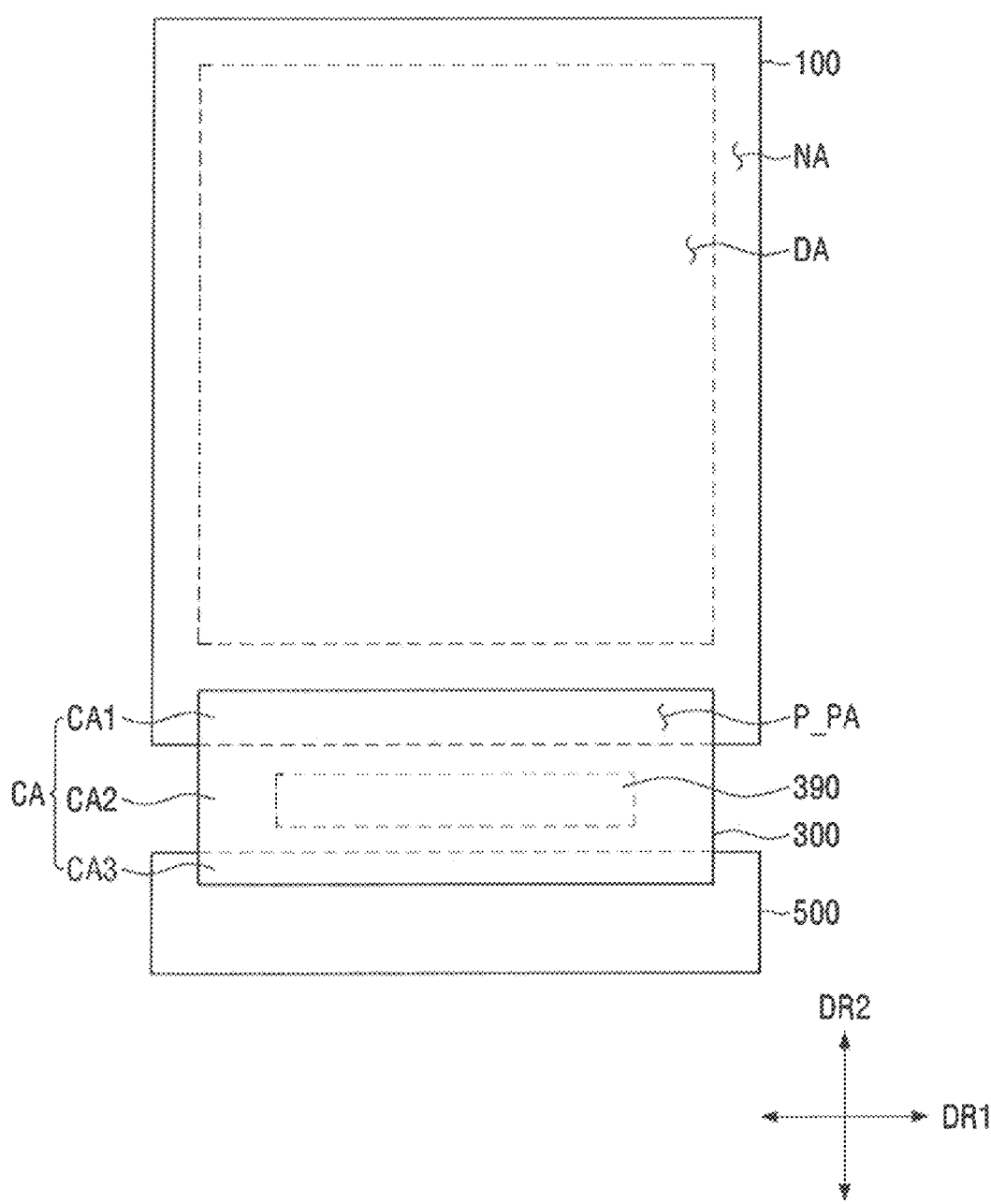
FIG. 1 is a plan layout view of a display device according to an exemplary embodiment of the inventive concept.

Exemplary embodiments of the inventive concept provide a display device capable of preventing corrosion of a lead wiring.

Exemplary embodiments of the inventive concept will be described more fully hereinafter with reference to the accompanying drawings. Like reference numerals may refer to like elements throughout this application.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Figure 2:
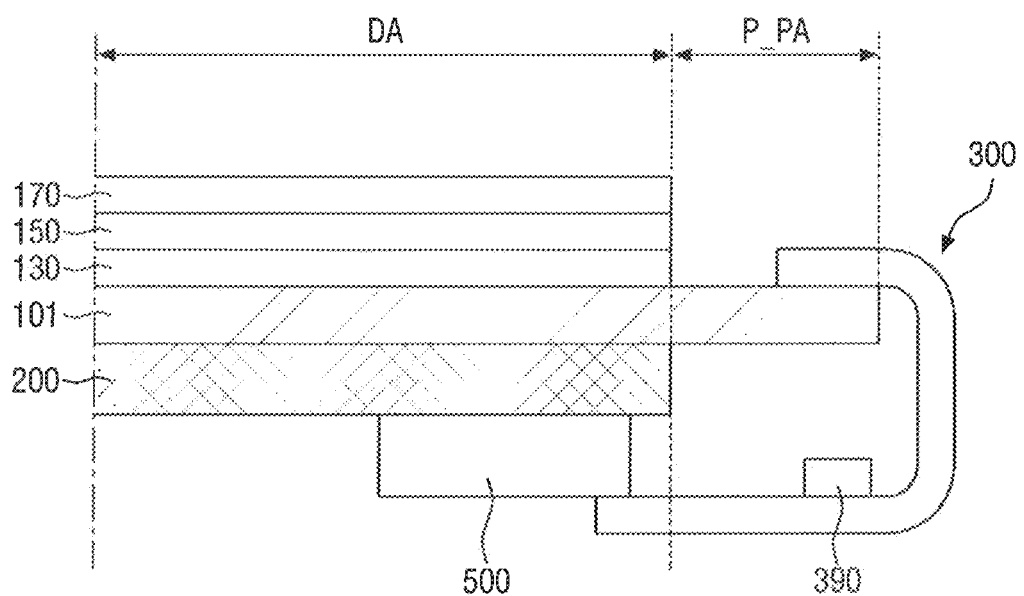
FIG. 2 is a cross-sectional view of the display device of FIG. 1 according to an exemplary embodiment of the inventive concept.
Figure 3:
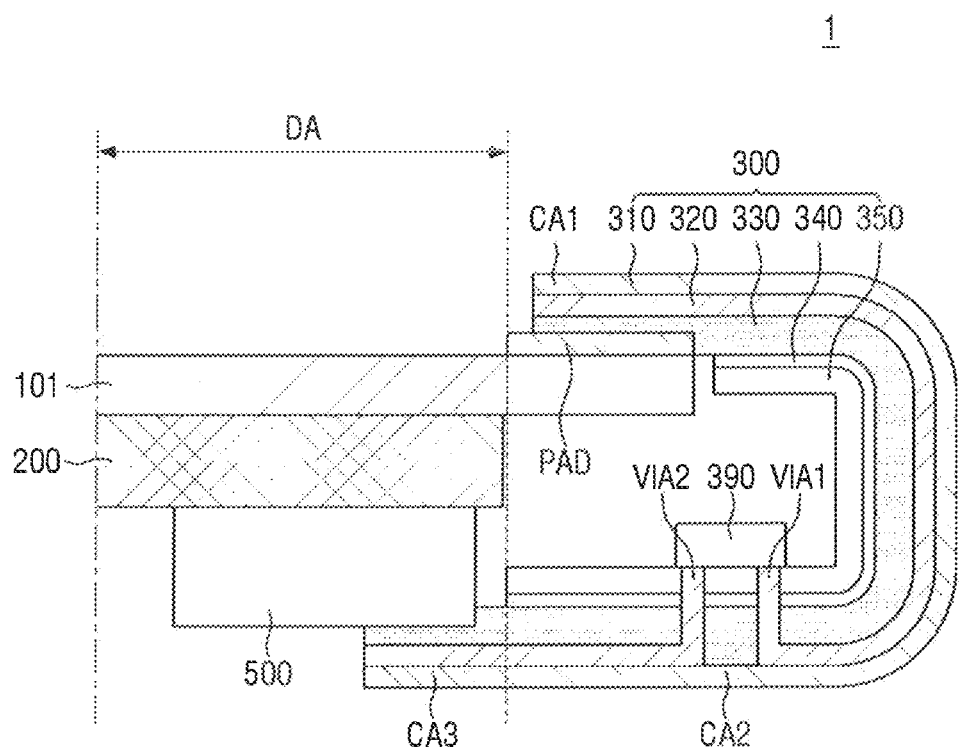
FIG. 3 is an enlarged cross-sectional view of the display device of FIG. 1 according to an exemplary embodiment of the inventive concept.
Figure 4:
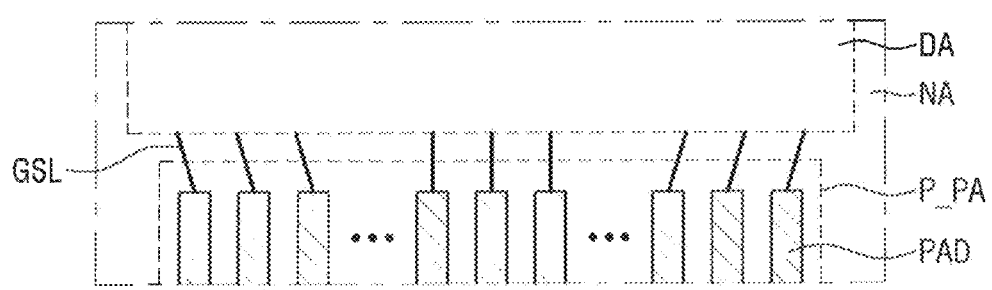
FIG. 4 is a plan layout view of a pad area of a display panel of the display device of FIG. 1 according to an exemplary embodiment of the inventive concept.
Figure 4:
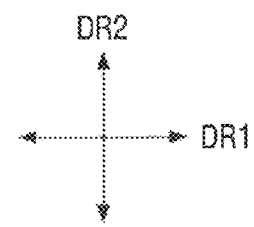
Figure 5:
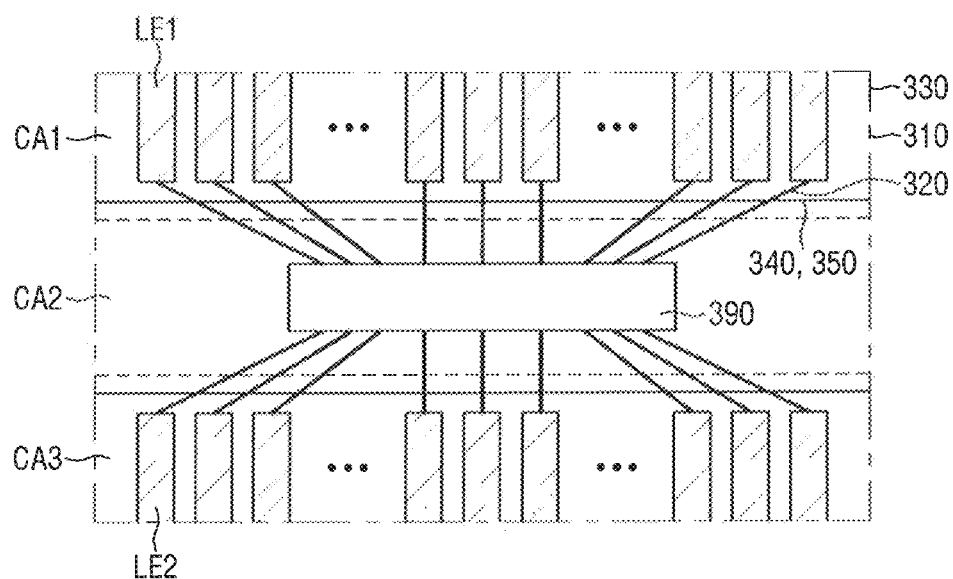
FIG. 5 is a plan layout view of a first circuit board of the display device of FIG. 1 according to an exemplary embodiment of the inventive concept.
Figure 5:
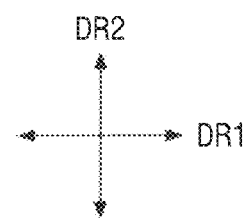
Figure 6:
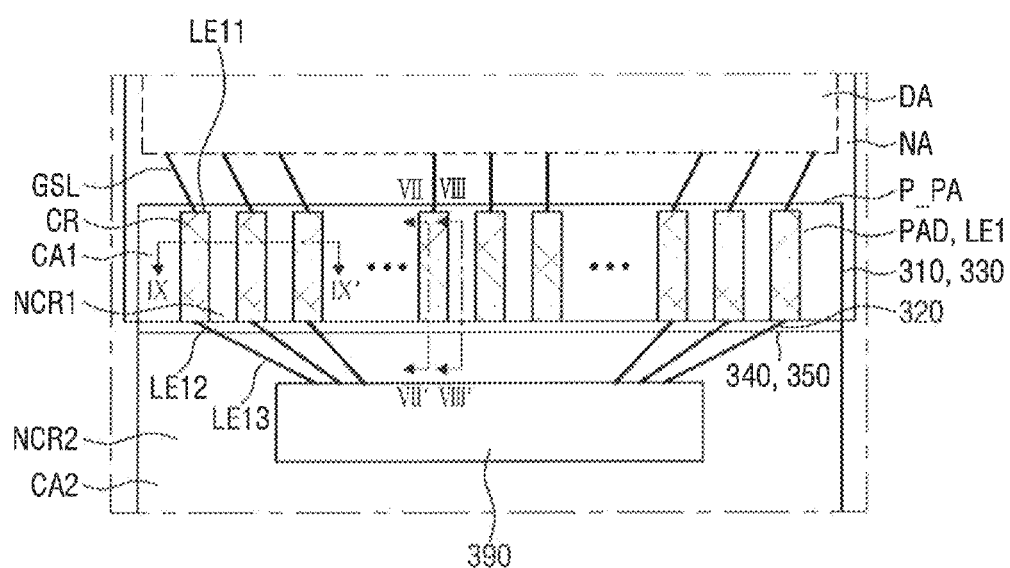
FIG. 6 is a plan layout view of a pad area of a display panel and a first circuit board attached to the pad area of the display device of FIG. 1 according to an exemplary embodiment of the inventive concept.
Figure 7:
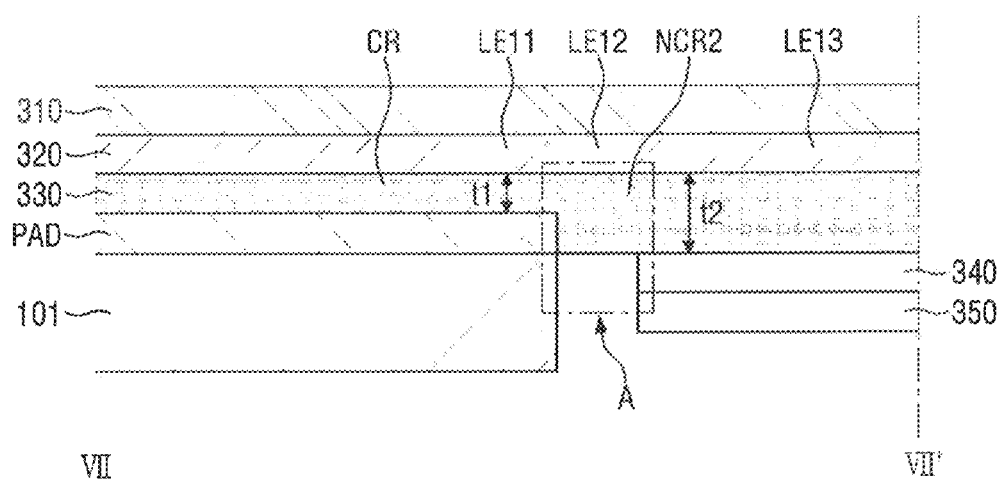
FIG. 7 is a cross-sectional view taken along the line VII-VII' of FIG. 6 according to an exemplary embodiment of the inventive concept.
Figure 8:
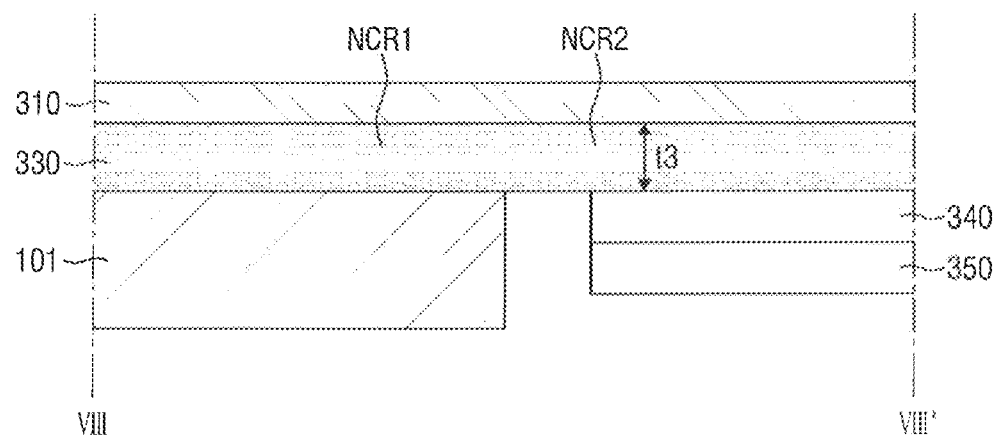
FIG. 8 is a cross-sectional view taken along the line VIII-VIII' of FIG. 6 according to an exemplary embodiment of the inventive concept.
Figure 9:
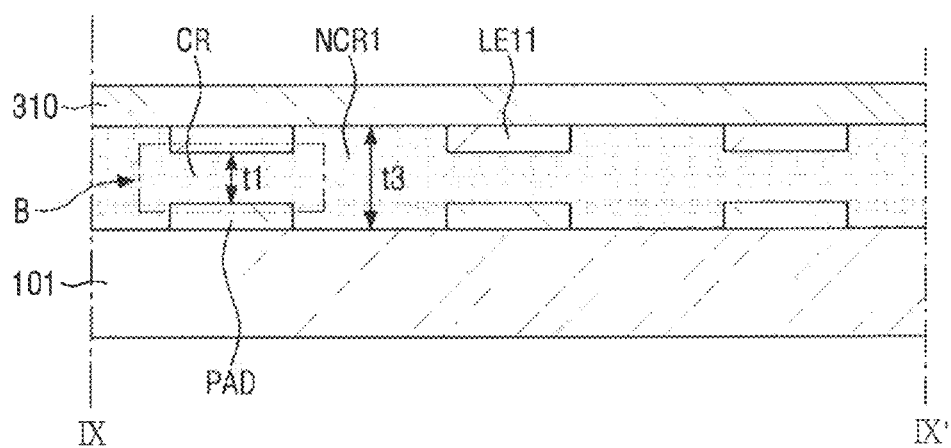
FIG. 9 is a cross-sectional view taken along the line IX-IX' of FIG. 6 according to an exemplary embodiment of the inventive concept.
Figure 10:
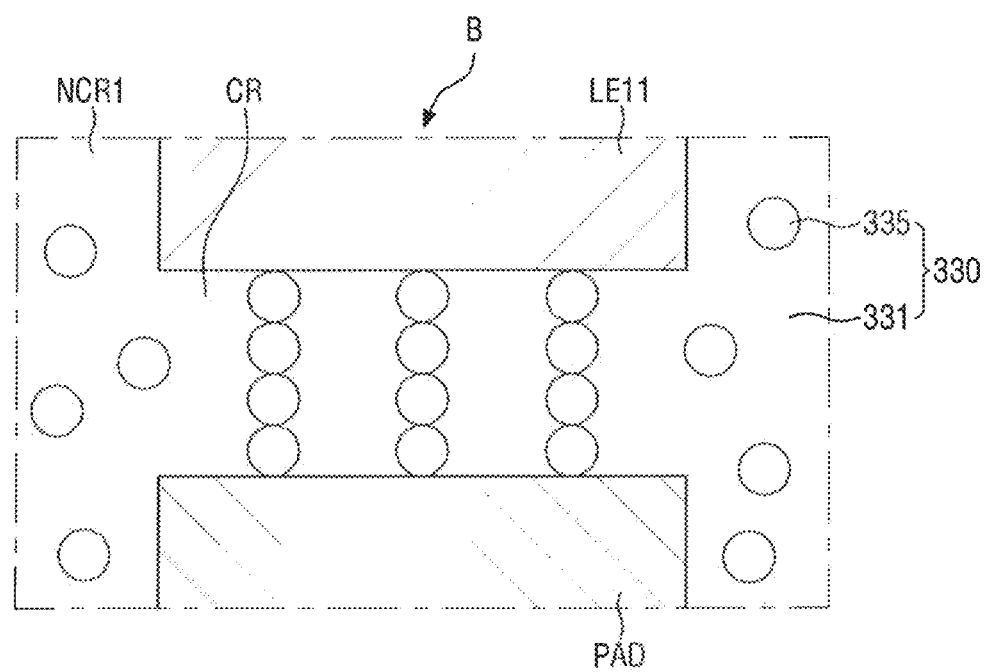
FIG. 10 is a view showing the area B in FIG. 9 according to an exemplary embodiment of the inventive concept.
Figure 11:
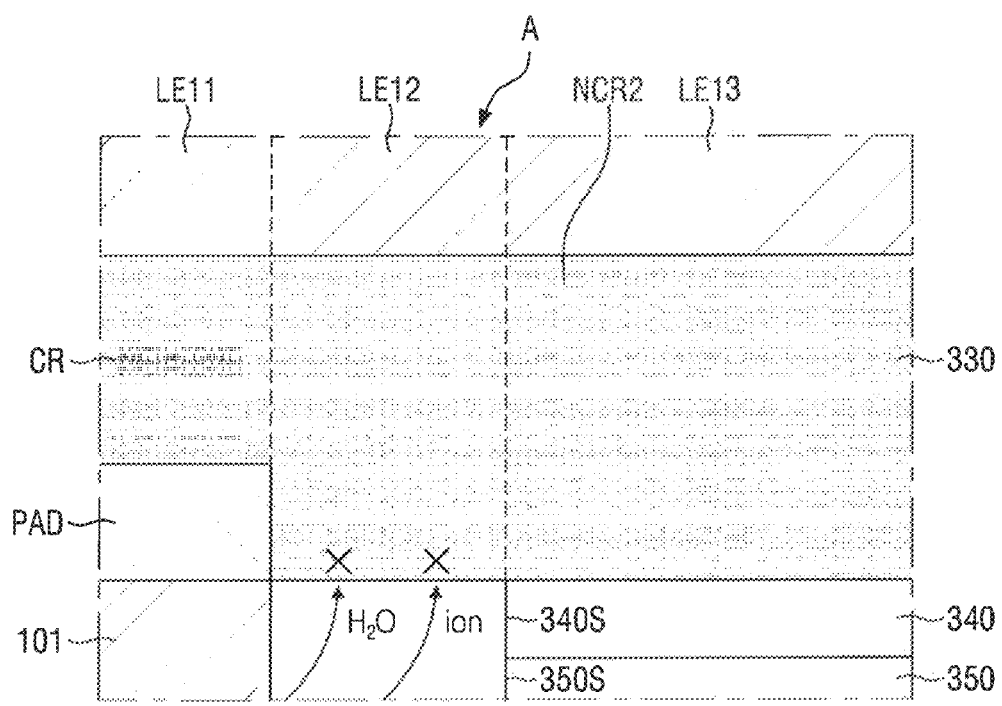
FIG. 11 is a view showing the area A in FIG. 7 according to an exemplary embodiment of the inventive concept.

FIG. 1 is a plan layout view of a display device according to an exemplary embodiment of the inventive concept. FIG. 2 is a cross-sectional view of the display device of FIG. 1 according to an exemplary embodiment of the inventive concept. FIG. 3 is an enlarged cross-sectional view of the display device of FIG. 1 according to an exemplary embodiment of the inventive concept. FIG. 4 is a plan layout view of a pad area of a display panel of the display device of FIG. 1 according to an exemplary embodiment of the inventive concept. FIG. 5 is a plan layout view of a first circuit board of the display device of FIG. 1 according to an exemplary embodiment of the inventive concept. FIG. 6 is a plan layout view of a pad area of a display panel and a first circuit board attached to the pad area of the display device of FIG. 1 according to an exemplary embodiment of the inventive concept. FIG. 7 is a cross-sectional view taken along the line VII-VII' of FIG. 6 according to an exemplary embodiment of the inventive concept. FIG. 8 is a cross-sectional view taken along the line VIII-VIII' of FIG. 6 according to an exemplary embodiment of the inventive concept. FIG. 9 is a cross-sectional view taken along the line IX-IX' of FIG. 6 according to an exemplary embodiment of the inventive concept. FIG. 10 is a view showing the area B in FIG. 9 according to an exemplary embodiment of the inventive concept. FIG. 11 is a view showing the area A in FIG. 7 according to an exemplary embodiment of the inventive concept.

A display device 1, which is a device for displaying a moving image or a still image, may be used as a display screen of various products such as televisions, notebooks, monitors, billboards, and Internet of Things devices, as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs.

Referring to FIGS. 1 to 11, the display device 1 may include a display panel 100 for displaying an image, a first circuit board 300 connected to the display panel 100, and a second circuit board 500 connected to the first circuit board 300.

In the following exemplary embodiments, the display panel 100 may be, for example, an organic light emitting display panel. However, the inventive concept is not limited thereto, and the display panel 100 may be different kinds of display panels such as a liquid crystal display panel (LCD), a quantum dot organic light emitting display panel (QD-OLED), a quantum dot liquid crystal display panel (QD-LCD), a quantum nano-emitting display panel (QNED), or a micro LED.

The display panel 100 includes a display area DA including a plurality of pixel areas and a non-display area NA disposed around the display area DA. The display area DA may have a rectangular shape having angular corners or a rectangular shape having rounded corners. The display areas DA may have short sides and long sides. The short sides of the display area DA may be sides extending in a first direction DR1. The long sides of the display area DA may be sides extending in a second direction DR2 crossing the first direction DR1. However, the planar shape of the display area DA is not limited to a rectangular shape, and may be a circular shape, an elliptical shape, or various other shapes. The non-display area NA may be disposed adjacent to both short sides and both long sides of the display area DA. In this case, the non-display areas NDA may surround all sides of the display area DA, and may constitute a frame of the display area DA. However, the inventive concept is not limited thereto, and the non-display area NA may be disposed adjacent to only both short sides or both long sides of the display area DA.

The non-display area NA of the display panel 100 further includes a panel pad area P_PA. The panel pad area P_PA may be disposed, for example, around one short side of the display area DA. However, the inventive concept is not limited thereto, and the panel pad areas P_PA may be disposed around both short sides of the display area DA or may be disposed around both short sides and both long sides of the display area DA.

The first circuit board includes a circuit area CA. For example, the first circuit board 300 may include a first circuit area CA1 whose one side is attached to the panel pad area P_PA of the display panel 100, a second circuit area CA2 disposed at one side of the first circuit area CA1 in the second direction DR2, and a third circuit area CA3 disposed at one side of the second circuit area CA2 in the second direction DR2 and attached to the second circuit board 500.

The first circuit board 300 may further include a driving integrated circuit 390 disposed in the second circuit area CA2. The driving integrated circuit 390 may be, for example, a data driving integrated circuit, and a chip-on-film (COF) implemented by a data driving chip may be applied to the driving integrated circuit 390.

The second circuit board 500 may include a circuit pad area attached to the third circuit area CA3 of the first circuit board 300. A plurality of circuit signal wirings may be arranged in the circuit pad area of the second circuit board 500 to be connected to lead wirings arranged in the third circuit area CA3 of the first circuit board 300.

Referring to FIG. 2, the display panel 100 includes a display substrate 101 disposed over the display area DA and the panel pad area P_PA, a circuit layer 130 disposed on the display substrate 101 in the display area DA, a light emitting layer 150 disposed on the circuit layer 130 in the display area DA, and an encapsulation layer 170 disposed on the light emitting layer 150 in the display area DA. Each of the pixel areas of the display area DA described above may include the circuit layer 130 and the light emitting layer 150.

The circuit layer 130 may include a display wiring, a display electrode, and at least one transistor, and may control a light emission amount of the light emitting layer 150.

The light emitting layer 150 may include an organic light emitting material. The light emitting layer 150 may be encapsulated by the encapsulation layer 170.

The encapsulation layer 170 may encapsulate the light emitting layer 150 to prevent moisture or the like from being introduced into the encapsulation layer 170 from the outside. The encapsulation layer 170 may be formed of a single-layer film of an inorganic film or a multi-layer film of inorganic films, or may be formed of a laminated film in which inorganic films and organic films are alternately laminated.

The display device 1 further includes a panel lower sheet 200 disposed under the display panel 100. The panel lower sheet 200 may be attached to the back surface of the display panel 100. The panel lower sheet 200 includes at least one functional layer and a lower insulating layer. The functional layer may be a layer that performs a heat radiation function, an electromagnetic wave blocking function, a grounding function, a buffering function, a strength enhancement function, a supporting function, and/or a digitizing function. The function layer may be a sheet layer, a film layer, a thin film layer, a coating layer, a panel, or a plate. One functional layer may be formed as a single layer, but may also be formed as a plurality of laminated thin films or coating layers. The functional layer may be, for example, a supporting substrate, a heat radiation layer, an electromagnetic wave blocking layer, an impact absorbing layer, a digitizer, or the like.

The first circuit board 300 may be bent downward in a third direction DR3 crossing the second direction DR2 as shown in FIG. 2. For example, the first circuit board 300 may be bent in a direction opposite to a display surface of the display panel 100. The other side of the first circuit board 300 and the second circuit board 500 may be located under the panel lower sheet 200.

Referring to FIG. 3, the display panel 100 may further include a signal wiring PAD disposed on the panel pad area P_PA of the display substrate 101. The signal wiring PAD may be electrically connected to a thin film transistor of the circuit layer 130 described above with reference to FIG. 2. The signal wiring PAD may be formed through the same process as that of a conductive layer in which a source electrode SE, a drain electrode DE, and a high potential voltage electrode ELVDDE of the circuit layer 130 are formed.

The signal wiring PAD may include at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), or copper (Cu). The signal wiring PAD may be a single film including at least one of the above-listed materials. However, the inventive concept is not limited thereto, and the signal wiring PAD may be a laminated film.

The first circuit board 300 may include a base film 310, a lead wiring layer 320 disposed on the base film 310, an anisotropic conductive film 330 disposed on the lead wiring layer 320, a lead bonding layer 340 disposed on the anisotropic conductive film 330, and an organic protective layer 350 disposed on the lead bonding layer 340.

The base film 310 may be disposed over the first circuit area CA1 to the third circuit area CA3, and may serve to support the upper structure of the first circuit board 300.

The lead wiring layer 320 may be disposed on the base film 310. The lead wiring layer 320 may be disposed over the first to third circuit areas CA1 to CA3.

For example, the lead wiring layer 320 may include a metal material. The lead wiring layer 320 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), or copper (Cu). In an exemplary embodiment of the inventive concept, the lead wiring LE may include copper (Cu) and gold (Au).

The anisotropic conductive film 330 may be disposed on the lead wiring layer 320. The anisotropic conductive film 330 may be disposed over the first to third circuit areas CA1 to CA3. The anisotropic conductive film 330 may serve to electrically connect the signal wiring PAD of the display panel 100 and the lead wiring layer 320 of the first circuit board 300.

As shown in FIG. 10, the anisotropic conductive film 330 may include a resin film 331 and a plurality of conductive balls 335 dispersed in the resin film 331. Each of the conductive balls 335 may have a structure in which the surface of a polymer particle is coated with a metal such as nickel (Ni) or gold (Au). The resin film 331 may include a thermosetting resin or a thermoplastic resin. In addition, the resin film 331 of the anisotropic conductive film 330 may further include a material having an adhesive function. In this case, the anisotropic conductive film 330 may be attached to the adjacent lead wiring layer 320. However, the adhesive force of the resin film 331 may be smaller than the adhesive force of the aforementioned lead bonding layer 340.

The anisotropic conductive film 330 may serve to electrically connect the signal wiring PAD and the lead wiring layer 320 in the first circuit area CA1, and may serve to electrically connect the lead wiring layer 320 and the circuit signal wiring of the second circuit board 500 in the third circuit area CA3. Meanwhile, the anisotropic conductive film 330 may cover the lead bonding layer 340 and the lead wiring layer 320 exposed by the organic protective layer 350 in the second circuit area CA2 to protect the exposed lead wiring layer 320 from external moisture and/or corrosion promoting ions. In other words, the anisotropic conductive film 330 may serve as a waterproof film for preventing external moisture permeation.

The lead bonding layer 340 may be disposed on the anisotropic conductive film 330. The lead bonding layer 340 may serve to bond the anisotropic conductive film 330 and the organic protective layer 350 to each other. The lead bonding layer 340 may include an adhesive layer or a resin layer. For example, the lead bonding layer 340 may include a silicon-based polymer material, a urethane-based polymer material, a silicon-urethane hybrid structured SU polymer, an acryl-based polymer material, an isocyanate-based polymer material, a polyvinyl alcohol-based polymer material, a gelatin-based polymer material, a vinyl-based polymer material, a latex-based polymer material, a polyester-based polymer material, or an aqueous polyester-based polymer material.

The organic protective layer 350 may be disposed on the lead bonding layer 340. The organic protective layer 350 may protect the lead bonding layer 340, the anisotropic conductive film 330, and the lead wiring layer 320 from external moisture and/or foreign matter.

The organic protective layer 350 may include an organic insulating material. Examples of the organic insulating material may include a polyacrylate resin, an epoxy resin, a phenolic resin, a polyamide resin, a polyimide resin, an unsaturated polyester resin, a polyphenylene resin, a polyphenylene sulfide resin, or benzocyclobutene (BCB).

The lead bonding layer 340 and the organic protective layer 350 may be disposed in the second circuit area CA2, and may expose the anisotropic conductive film 330 and the lead wiring layer 320 in the first circuit area CA1 and the third circuit area CA3.

As shown in FIG. 3, one side surface of the lead bonding layer 340 facing one side surface of the display panel 100, and one side surface of the organic protective layer 350 facing the one side surface of the display panel 100 may be aligned with each other in a thickness direction. Further, the one side surface of the lead bonding layer 340 facing the one side surface of the display panel 100, and the one side surface of the organic protective layer 350 facing the one side surface of the display panel 100 may be spaced apart from the one side surface of the display panel 100. In other words, the one side surface of the lead bonding layer 340 facing the one side surface of the display panel 100, and the one side surface of the organic protective layer 350 facing the one side surface of the display panel 100 may be located to be spaced apart from the one side surface of the display panel 100, thus sufficiently securing a mounting tolerance to facilitate the process of attaching the first circuit board 300 to the display panel 100.

Similarly, the other side surface of the lead bonding layer 340 facing one side surface of the second circuit board 500, and the other side surface of the organic protective layer 350 facing the one side surface of the second circuit board 500 may be aligned with each other in a thickness direction. Further, the other side surface of the lead bonding layer 340 facing the one side surface of the second circuit board 500, and the other side surface of the organic protective layer 350 facing the one side surface of the second circuit board 500 may be spaced apart from the one side surface of the second circuit board 500. In other words, the other side surface of the lead bonding layer 340 facing the one side surface of the second circuit board 500, and the other side surface of the organic protective layer 350 facing the one side surface of the second circuit board 500 may be located to be spaced apart from the one side surface of the second circuit board 500, thus sufficiently securing a mounting tolerance to facilitate the process of attaching the second circuit board 500 to the first circuit board 300.

The driving integrated circuit 390 may be disposed on the organic protective layer 350. The organic protective layer 350, the lead bonding layer 340, and the anisotropic conductive film 330 may include via holes VIA1 and VIA2 formed therein to overlap the driving integrated circuit 390 in the thickness direction. In other words, the via holes VIA1 and VIA2 may be located in the second circuit area CA2.

The via holes VIA1 and VIA2 may completely penetrate the organic protective layer 350, the lead bonding layer 340, and the anisotropic conductive film 330 to electrically connect the driving integrated circuit 390 and the lead wiring layer 320. The first via hole VIA1 may be located closer to the first circuit area CA1 than the second via hole VIA2.

Referring to FIG. 4, a plurality of signal wirings PAD may be provided, and the plurality of signal wirings PAD may be arranged along the first direction DR1. The plurality of signal wirings PAD may include, for example, power source signal wirings, data signal wirings, and panel dummy wirings. The plurality of signal wirings PAD other than the panel dummy wirings may be electrically connected to the thin film transistors of the circuit layer 130 of the display area DA through gate signal lines GSL. In contrast, the panel dummy wirings may not be electrically connected to the gate signal lines GSL. However, even when the panel dummy wirings are electrically connected to the gate signal lines GSL, the gate signal lines GSL connected to the panel dummy wirings may be electrically separated and isolated from the thin film transistors of the circuit layer 130 of the display area DA.

Referring to FIG. 5, the lead wiring layer 320 may include a plurality of first lead wirings LE1 and a plurality of second lead wirings LE2. The plurality of first lead wirings LE1 may be arranged in the first circuit area CA1, and the plurality of second lead wirings LE2 may be arranged in the third circuit area CA3. The plurality of first lead wirings LE1 and the plurality of second lead wirings LE2 may be arranged along the first direction DR1.

The plurality of lead wirings LE1 and LE2 may include a power lead wiring, a data lead wiring, and a dummy lead wiring. For example, the plurality of second lead wirings LE2 may receive a high-potential power supply signal, a low-potential power supply signal, a data signal, or the like from the circuit signal wirings of the second circuit board 500, and may be electrically connected to the driving integrated circuit 390. The plurality of first lead wirings LE1 may receive a high-potential power supply signal, a low-potential power supply signal, a data signal, or the like from the driving integrated circuit 390, and may transmit the high-potential power supply signal, the low-potential power supply signal, the data signal, or the like to the plurality of signal wirings PAD of the panel pad area P_PA.

However, the dummy lead wirings of the first lead wiring LE1 and the second lead wiring LE2 may be physically separated from the driving integrated circuit 390 as to not be electrically connected to the driving integrated circuit 390.

The power wirings of the first lead wiring LE1 and the second lead wiring LE2 may be directly connected to one another, but the inventive concept is not limited thereto.

As shown in FIG. 5, the anisotropic conductive film 330 may be disposed over the entire surface of the first circuit board 300. The anisotropic conductive film 330 may include a first long side edge located above in the second direction DR2 and a second long side edge facing the first long side edge and located below in the second direction DR2. The first long side edge of the anisotropic conductive film 330 may be located at one end of the first circuit board 300 in the second direction DR2, and the second long side edge thereof may be located at the other end of the first circuit board 300 in the second direction DR2.

The planar size of the organic protective layer 350 may be smaller than the planar size of the anisotropic conductive film 330. In other words, the organic protective layer 350 may include a third long side edge located above in the second direction DR2 and a fourth long side edge facing the third long side edge and located below in the second direction DR2. It is shown in FIG. 5 that the third long side edge of the organic protective layer 350 is located in the first circuit area CA1, and the fourth long side edge thereof is located in the second circuit area CA2. In this case, the side surface of the third long side edge of the organic protective layer 350 and the side surface of the fourth long side edge of the organic protective layer 350 are located between the side surface of the first long side edge of the anisotropic conductive film 330 and the side surface of the second long side edge of the anisotropic conductive film 330. In other words, a distance between the side surface of the third long side edge of the organic protective layer 350 and the side surface of the fourth long side edge of the organic protective layer 350 is less than a distance between the side surface of the first long side edge of the anisotropic conductive film 330 and the side surface of the second long side edge of the anisotropic conductive film 330.

The organic protective layer 350 may expose the plurality of first lead wirings LE1 in the first circuit area CA1, and may expose the plurality of second lead wirings LE2 in the third circuit area CA3. However, the inventive concept is not limited thereto, and the third long side edge of the organic protective layer 350 and the fourth long side edge thereof may be located in the second circuit area CA2. In this case, the organic protective layer 350 may expose the plurality of the first lead wirings LE1 in a part of the second circuit area CA2 and the first circuit area CA1, and may expose the plurality of the second lead wirings LE2 in a part of the second circuit area CA2 and the third circuit area CA3.

Referring to FIG. 6, the anisotropic conductive film 330 may include a conductive region CR located in the first circuit area CA1 to overlap the signal wiring PAD, a first non-conductive region NCR1 located in the first circuit area CA1 that does not overlap both the signal wiring PAD and the first lead wiring LE1, and a second non-conductive region NCR2 1 located in the second circuit area CA2.

Further, each first lead wiring LE1 may include a first sub-lead portion LE11 exposed by the organic protective layer 350 and overlapping the signal wiring PAD, a second sub-lead portion LE12 exposed by the organic protective layer 350 and not overlapping the signal wiring PAD, and a third sub-lead portion LE13 overlapping the organic protective layer 350.

The first sub-lead portion LE11 of the first lead wiring LE1 may be disposed to overlap the conductive region CR of the anisotropic conductive film 330, and the second sub-lead portion LE12 and third sub-lead portion LE13 of the first lead wiring LE1 may be disposed in the second non-conductive region NCR2 of the anisotropic conductive film 330.

Referring to FIG. 7, the conductive region CR of the anisotropic conductive film 330 is disposed between the first sub-lead portion LE11 of the first lead wiring LE1 and the signal wiring PAD to electrically connect the first sub-lead portion LE11 of the first lead wiring LE1 and the signal wiring PAD. The conductive region CR of the anisotropic conductive film 330 may be in direct contact with the first sub-lead portion LE11 and the signal wiring PAD.

The second non-conductive region NCR2 of the anisotropic conductive film 330 may cover the second sub-lead portion LE12 and third sub-lead portion LE13 of the first lead wiring LE1 and the signal wiring PAD, and may be in contact with the lower surfaces of the second sub-lead portion LE12 and third sub-lead portion LE13 of the first lead wiring LE1 and the upper surface of the signal wiring PAD. Further, the second non-conductive region NCR2 of the anisotropic conductive film 330 may be in contact with one side surface of the signal wiring PAD aligned with the display substrate 101.

The second non-conductive region NCR2 of the anisotropic conductive film 330 may cover both a region where the organic protective layer 350 and the lead bonding layer 340 are disposed and a region where the organic protective layer 350 and the lead bonding layer 340 are not disposed. In other words, the second non-conductive region NCR2 of the anisotropic conductive film 330 may be located in a space between the second sub-lead portion LE12 of the first lead wiring LE1 and one side surface of the organic protective layer 350 facing one side surface of the display panel 100 (e.g., the display substrate 101 thereof) and a space between the second sub-lead portion LE12 and the one side surface of the display panel 100, and may also be located between the second sub-lead portion LE12 and the lead bonding layer 340.

A first thickness t1 of the conductive region CR of the anisotropic conductive film 330 may be smaller than a second thickness t2 of the second non-conductive region NCR2 of the anisotropic conductive film 330. The reason for this is that the conductive region CR of the anisotropic conductive film 330 is in contact with both the first sub-lead portion LE11 of the first lead wiring LE1 and the underlying signal wiring to be pressed in the thickness direction, whereas the second non-conductive region NCR2 of the anisotropic conductive film 330 is pressed in the thickness direction only by the second sub-lead portion LE12 or third sub-lead portion LE13 of the overlying first lead wiring LE1 without being pressed thereunder with the signal wiring PAD. The second non-conductive region NCR2 may have the thickness t2 between the second sub-lead portion LE12 and the lead bonding layer 340/the organic protective layer 350.

Referring to FIG. 8, the first non-conductive region NCR1 of the anisotropic conductive film 330 may be disposed between the base film 310 and the display substrate 101. In other words, the first non-conductive region NCR1 of the anisotropic conductive film 330 may be in contact with the bottom surface of the base film 310, and may be in contact with the display panel 100. The second non-conductive region NCR2 of the anisotropic conductive film 330 may be disposed between the base film 310 and the lead bonding layer 340 and the organic protective layer 350. As shown in FIG. 8, the second non-conductive region NCR2 of the anisotropic conductive film 330 may be located between the base film 310 and one side surface of the organic protective layer 350 facing one side surface of the display panel 100 (e.g., the display substrate 101 thereof) and between the base film 310 and the one side surface of the display panel 100, and may also be located between the base film 310 and the lead bonding layer 340 to be in contact with both the lower surface of the base film 310 and the upper surface of the lead bonding layer 340. The first non-conductive region NCR1 and second non-conductive region NCR2 of the anisotropic conductive film 330 shown in FIG. 8, unlike the second non-conductive region NCR2 of the anisotropic conductive film 330 shown in FIG. 7, may not overlap the first lead wiring line LE1.

The first non-conductive region NCR1 and second non-conductive region NCR2 of the anisotropic conductive film 330 shown in FIG. 8 may have substantially the same thickness. In other words, the first non-conductive region NCR1 and second non-conductive region NCR2 of the anisotropic conductive film 330 shown in FIG. 8 may have a third thickness t3. The third thickness t3 of each of the first nonconductive region NCR1 and second nonconductive region NCR2 of the anisotropic conductive film 330 (e.g., contacting the base film 310) may be greater than the second thickness t2 of the second non-conductive region NCR2 of the anisotropic conductive film 330 of FIG. 7.

The reason for this is that the second non-conductive region NCR2 of the anisotropic conductive film 330 overlapping the first lead wiring LE1 is pressed in the thickness direction by the first lead wiring LE1, whereas the first and second non-conductive regions NCR1 and NCR2 of the anisotropic conductive film 330 not overlapping the first lead wiring LE1 are not pressed by the first lead wiring LE1.

Referring to FIG. 9, the conductive region CR of the anisotropic conductive film 330 may overlap the first sub-lead portion LE11 of the first lead wiring LE1 and the signal wiring PAD. The conductive region CR of the anisotropic conductive film 330 overlapping the first sub-lead portion LE11 of the first lead wiring LE1 and the signal wiring PAD, unlike the first non-conductive region NCR1 of the anisotropic conductive film 330 overlapping the first sub-lead portion LE11 of the first lead wiring LE1 and the signal wiring PAD, may electrically connect the first sub-lead portion LE11 and the signal wiring PAD.

As shown in FIG. 10, the plurality of conductive balls 335 may electrically connect the first sub-lead portion LE11 of the first lead wiring to the signal wiring PAD in the conductive region CR, whereas the plurality of conductive balls 335 may be dispersed in the resin film 331 in the first non-conductive region NCR1 so as to not electrically connect the first lead wiring to the signal wiring PAD.

Referring to FIG. 9 again, the anisotropic conductive film 330 may cover and directly contact the lower surface and side surfaces of the first sub-lead portion LE11 of the first lead wiring LE1, and may cover and directly contact the upper surface and side surfaces of the signal wiring PAD.

Referring to FIG. 11, as described above, the anisotropic conductive film 330 may cover the lead bonding layer 340 and the lead wiring layer 320 exposed by the organic protective layer 350 to protect the exposed lead wiring layer 320 from external moisture and/or corrosion promoting ions.

Insulating layers of the display panel 100 may further include additive ions enhancing an insulating function, and these additive ions may be eluted to the outside of the insulating layers through external moisture in an environment of high temperature and high humidity. The additive ions eluted to the outside may cause corrosion of the first lead wiring LE1 of the adjacent first circuit board 300.

In other words, the organic protective layer 350 serving to protect the lead wiring layer 320 from external moisture and/or foreign matter is configured such that one side surface 350s of the organic protective layer 350, facing one side surface of the display panel 100 (e.g., the display substrate 101 thereof), is located to be spaced apart from the one side surface of the display panel 100. In this case, external moisture and/or external ions permeate toward the first lead wiring LE1 through a space between the one side surface of the display panel 100 and side surfaces 340s and 350s of the lead bonding layer 340 and the organic protective layer 350, facing the one side surface of the display panel 100.

However, in the display device 1 according to an exemplary embodiment of the inventive concept, the anisotropic conductive film 330 having a waterproof function may be disposed in a region of the first circuit board 300 where the first lead wiring LE1 is exposed by the organic protective layer 350, for example, the second sub-lead portion LE12, thus preventing external moisture and/or foreign matter from permeating into the first lead wiring LE1 through a space between the side surfaces 340s and 350s of the lead bonding layer 340 and the organic protective layer 350 and the one side surface of the display panel 100. Accordingly, corrosion of the first lead wiring LE1 may be prevented, and thus disconnection and/or short of the lead wrings may be prevented in advance.

Hereinafter, a display device according to an exemplary embodiment of the inventive concept will be described. In the following exemplary embodiment of the inventive concept, the same reference numerals as those in the exemplary embodiment described above are referred to by the same reference numerals, and a description thereof will be omitted or simplified.

Figure 12:
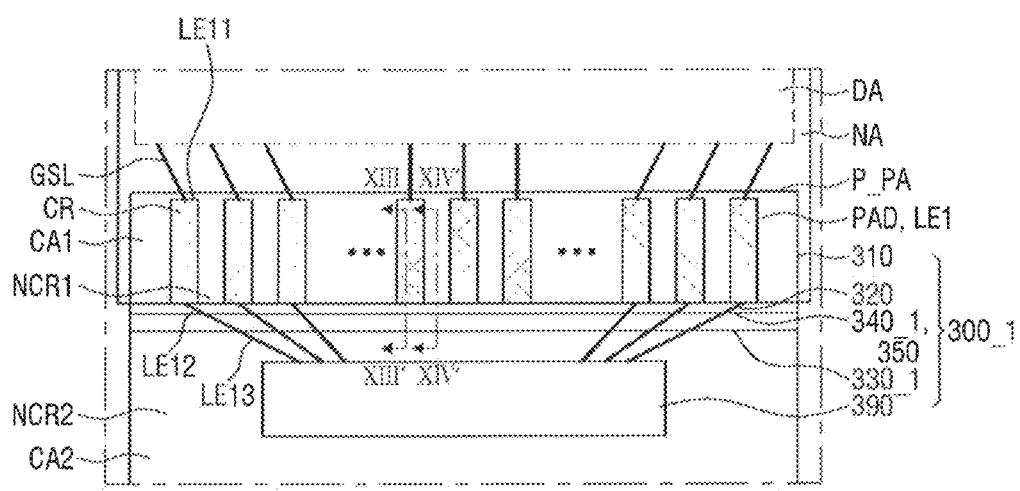
FIG. 12 is a plan layout view of a pad area of a display panel and a first circuit board attached to the pad area according to an exemplary embodiment of the inventive concept.
Figure 12:
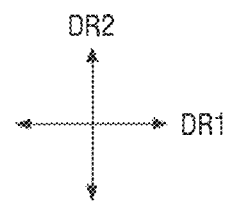
Figure 13:
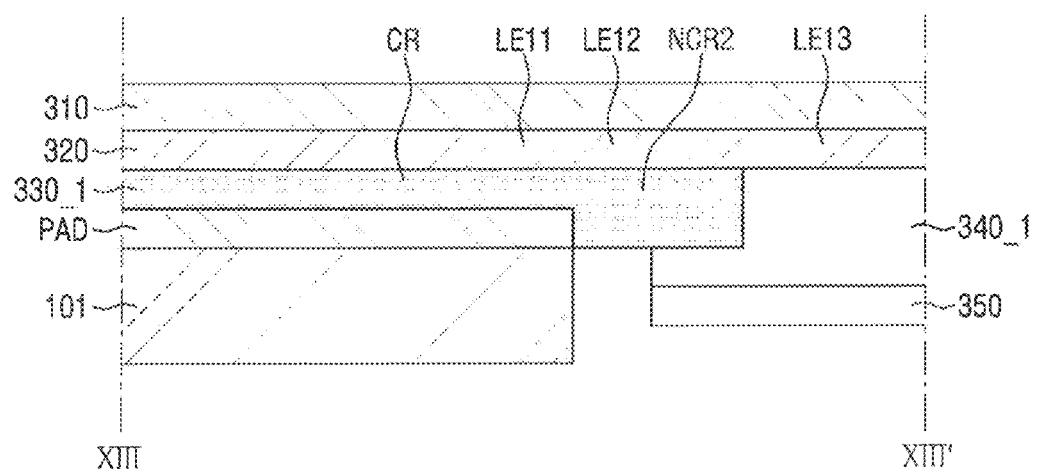
FIG. 13 is a cross-sectional view taken along the line XIII-XIII' of FIG. 12 according to an exemplary embodiment of the inventive concept.
Figure 14:
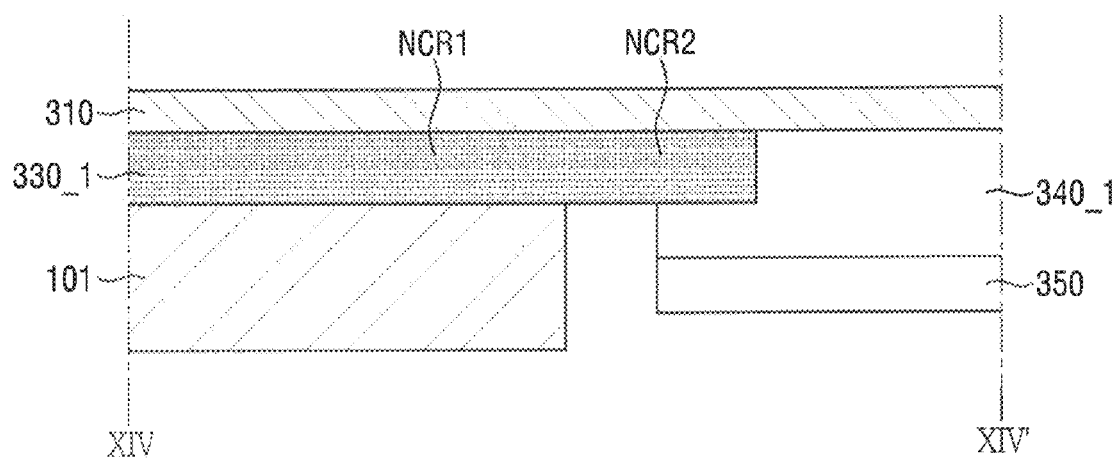
FIG. 14 is a cross-sectional view taken along the line XIV-XIV' of FIG. 12 according to an exemplary embodiment of the inventive concept.

FIG. 12 is a plan layout view of a pad area of a display panel and a first circuit board attached to the pad area according to an exemplary embodiment of the inventive concept. FIG. 13 is a cross-sectional view taken along the line XIII-XIII' of FIG. 12 according to an exemplary embodiment of the inventive concept. FIG. 14 is a cross-sectional view taken along the line XIV-XIV' of FIG. 12 according to an exemplary embodiment of the inventive concept.

Referring to FIGS. 12 to 14, a display device 2 according to the present exemplary embodiment is different from the display device 1 according to an exemplary embodiment of the inventive concept in that the planar size of an anisotropic conductive film 330_1 is smaller than the planar size of the anisotropic conductive film 330.

For example, the anisotropic conductive film 330_1 of a first circuit board 300_1 of the display device 2 according to the present exemplary embodiment may be disposed over the first circuit area CA1 and a part of the second circuit area CA2.

As shown in FIG. 12, the first long side edge of the anisotropic conductive film 330_1 is located at one end of the first circuit board 300_1 in the second direction DR2, but the second long side edge thereof may be located between the third long side edge and fourth long side edge of the organic protective layer 350. In other words, the side surface of the third long side edge of the organic protective layer 350 may be located between the side surface of the first long side edge of the anisotropic conductive film 330_1 and the side surface of the second long side edge of the anisotropic conductive film 330_1, and the side surface of the fourth long side edge of the organic protective layer 350 may be located between the side surface of the second long side edge of the anisotropic conductive film 330_1 and the side surface of the other end of the first circuit board 300_1.

Referring to FIG. 13, a lead bonding layer 340_1 may directly contact and cover the side surface of the region overlapping the third sub-lead portion LE13 of the first lead wiring LE1 of the anisotropic conductive film 330_1. Further, the lead bonding layer 340_1 may directly contact the third sub-lead portion LE13 of the first lead wiring LE1 of the first circuit board 300_1 in the region overlapping the third sub-lead portion LE13.

Even in this exemplary embodiment of the inventive concept, the anisotropic conductive film 330_1 may cover the lead bonding layer 340_1 and the lead wiring layer 320 exposed by the organic protective layer 350 to protect the exposed lead wiring layer 320 from external moisture and/or corrosion promoting ions.

In other words, the organic protective layer 350 serving to protect the lead wiring layer 320 from external moisture and/or foreign matter is configured such that one side surface of the organic protective layer 350 facing one side surface of the display panel 100 is located to be spaced apart from the one side surface of the display panel 100. In this case, external moisture and/or external ions permeate toward the first lead wiring LE1 through a space between the side surfaces of the organic protective layer 350 and the lead bonding layer 340_1 and the one side surface of the display panel 100.

However, in the display device 2 according to an exemplary embodiment of the inventive concept, the anisotropic conductive film 330_1 having a waterproof function may be disposed in a region of the first circuit board 300_1 where the first lead wiring LE1 is exposed by the organic protective layer 350, for example, the second sub-lead portion LE12, thus preventing external moisture and/or foreign matter from permeating into the first lead wiring LE1 through a space between the side surfaces of the organic protective layer 350 and the lead bonding layer 340_1 and the one side surface of the display panel 100. Accordingly, corrosion of the first lead wiring LE1 may be prevented, and thus disconnection and/or short of the lead wirings may be prevented in advance.

Figure 15:
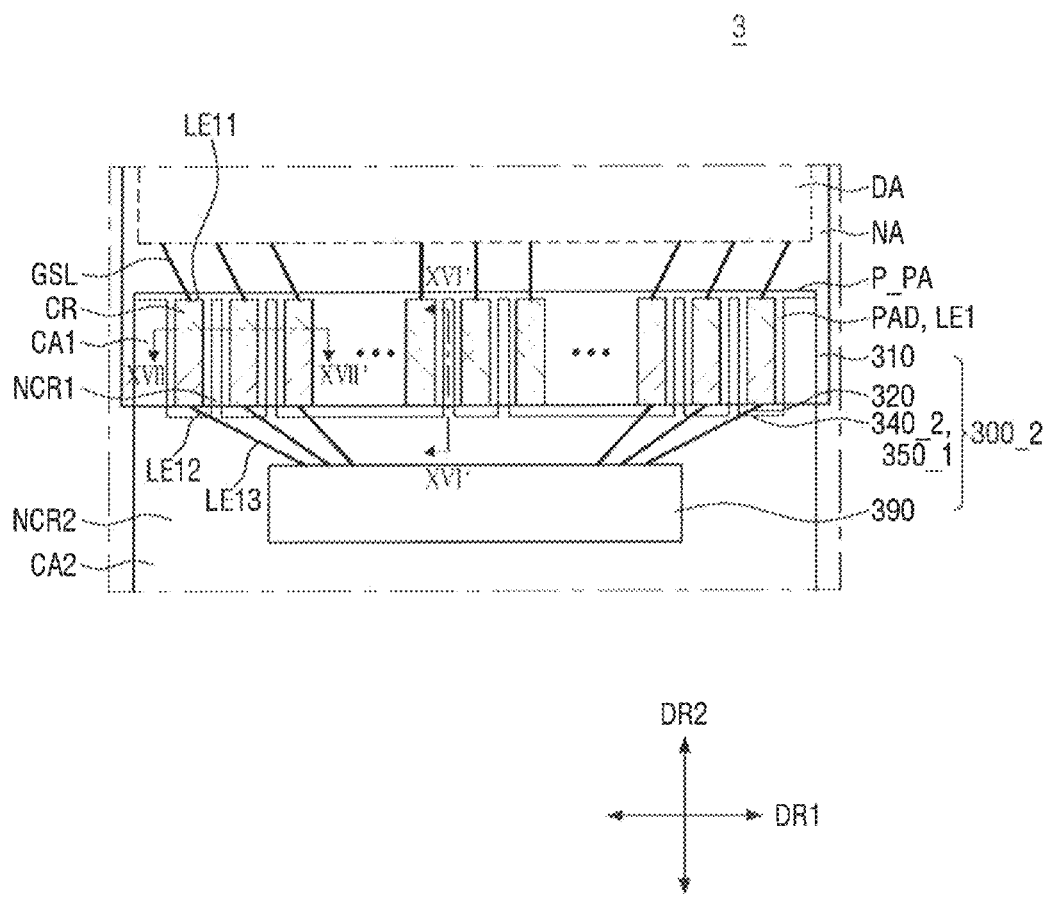
FIG. 15 is a plan layout view of a pad area of a display panel and a first circuit board attached to the pad area according to an exemplary embodiment of the inventive concept.
Figure 16:
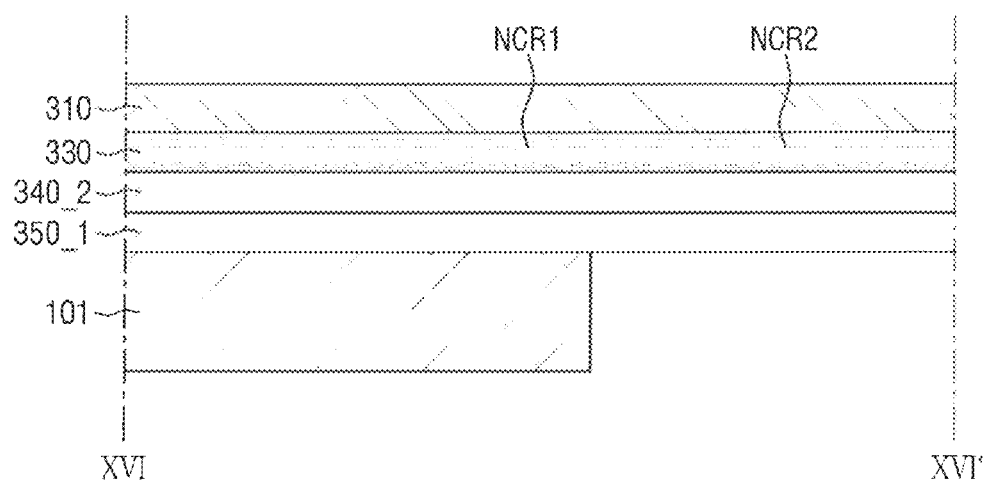
FIG. 16 is a cross-sectional view taken along the line XVI-XVI' of FIG. 15 according to an exemplary embodiment of the inventive concept.
Figure 17:
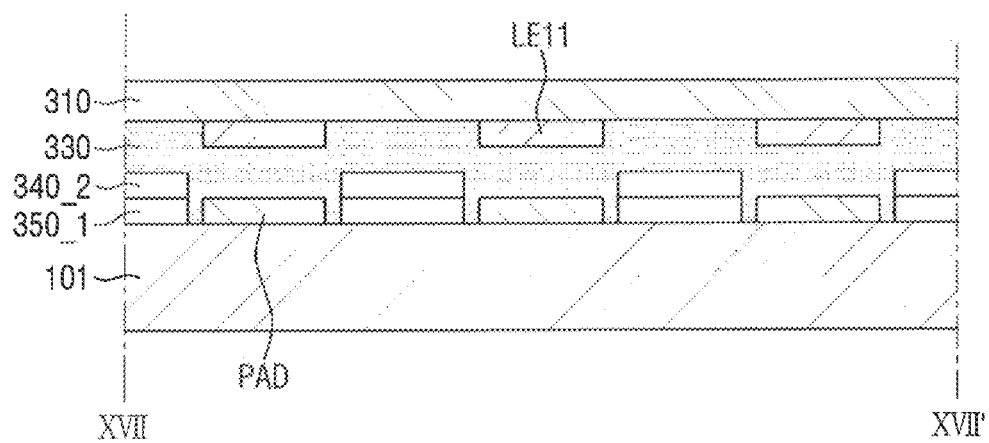
FIG. 17 is a cross-sectional view taken along the line XVII-XVII' of FIG. 15 according to an exemplary embodiment of the inventive concept.

FIG. 15 is a plan layout view of a pad area of a display panel and a first circuit board attached to the pad area according to an exemplary embodiment of the inventive concept. FIG. 16 is a cross-sectional view taken along the line XVI-XVI' of FIG. 15 according to an exemplary embodiment of the inventive concept. FIG. 17 is a cross-sectional view taken along the line XVII-XVII' of FIG. 15 according to an exemplary embodiment of the inventive concept.

Referring to FIGS. 15 to 17, a display device 3 according to the present exemplary embodiment is different from the display device 1 according to an exemplary embodiment of the inventive concept in that an organic protective layer 350_1 and a lead bonding layer 340_2 protrude from the first circuit area CA1.

For example, in a first circuit board 300_2 of the display device 3 according to the present exemplary embodiment, the organic protective layer 350_1 and the lead bonding layer 340_2 may be disposed between the first sub-lead portions LE11 of the first lead wiring LE1 in the first circuit area CA1. In other words, the organic protective layer 350_1 and lead bonding layer 340_2 of the first circuit board 300_2 may include a protrusion pattern portion overlapping the first non-conductive area NCR1 of the anisotropic conductive film 330 in the first circuit area CA1. The protrusion pattern portions of the organic protective layer 350_1 and the lead bonding layer 340_2 are located between the first sub-lead portions LE11 of the first lead wiring LE1, and the adjacent protrusion pattern portions may be spaced apart from each other. However, as shown in FIG. 15, the protrusion pattern portions of the organic protective layer 350_1 and the lead bonding layer 340_2 may be integrally formed with the organic protective layer 350 and the lead bonding layer 340 described with reference to FIG. 6, respectively.

In the first circuit board 300_2 according to the present exemplary embodiment, the organic protective layer 350_1 and lead bonding layer 340_2 of the first circuit board 300_2 include the protrusion pattern portion overlapping the first non-conductive area NCR1 of the anisotropic conductive film 330 in the first circuit area CA1, thus protecting the adjacent first sub-lead portions of the first lead wiring LE1 from external moisture and/or corrosion promoting ions.

Even in this exemplary embodiment of the inventive concept, the anisotropic conductive film 330 may cover the lead bonding layer 340_2 and the lead wiring layer 320 exposed by the organic protective layer 350_1 to protect the exposed lead wiring layer 320 from external moisture and/or corrosion promoting ions.

In other words, the organic protective layer 350_1 serving to protect the lead wiring layer 320 from external moisture and/or foreign matter is configured such that one side surface of the organic protective layer 350_1 facing one side surface of the display panel 100 is located to be spaced apart from the one side surface of the display panel 100. In this case, external moisture and/or external ions permeate toward the first lead wiring LE1 through a space between the one side surface of the organic protective layer 350_1, facing the one side surface of the display panel 100, and the one side surface of the display panel 100.

However, in the display device 3 according to an exemplary embodiment of the inventive concept, the anisotropic conductive film 330 having a waterproof function may be disposed in a region of the first circuit board 300_2 where the first lead wiring LE1 is exposed by the organic protective layer 350_1, for example, the second sub-lead portion LE12, thus preventing external moisture and/or foreign ions from permeating into the first lead wiring LE1 through a space between the one side surface of the organic protective layer 350_1 and the one side surface of the display panel 100. Accordingly, corrosion of the first lead wiring LE1 may be prevented, and thus disconnection and/or short of the lead wirings may be prevented in advance.

Figure 18:
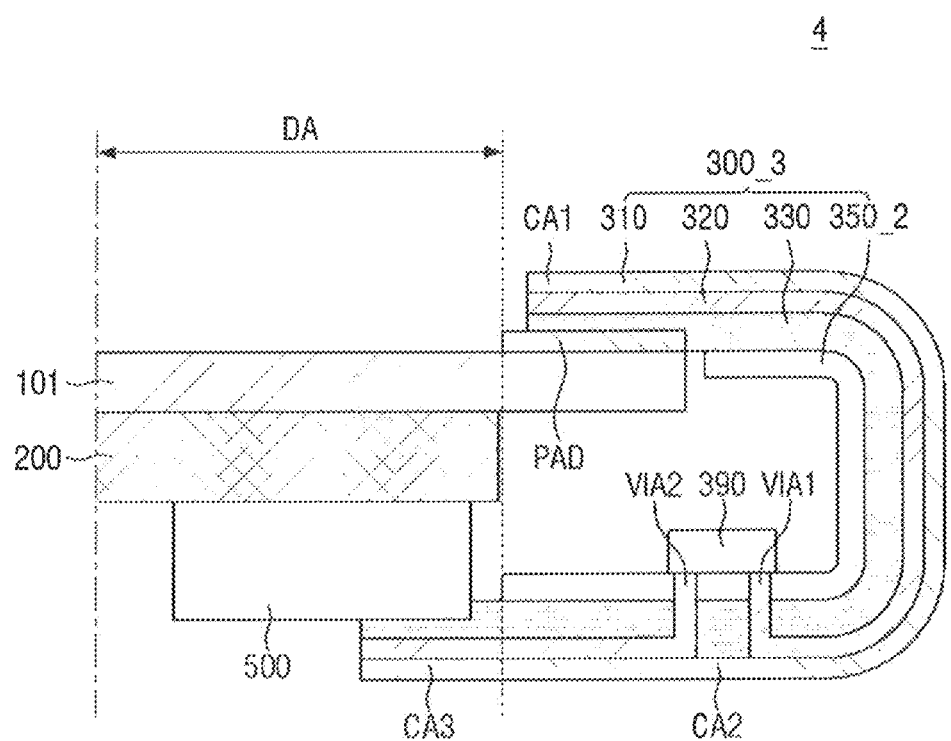
FIG. 18 is a cross-sectional view of a display device according to an exemplary embodiment of the inventive concept.

FIG. 18 is a cross-sectional view of a display device according to an exemplary embodiment of the inventive concept.

Referring to FIG. 18, a display device 4 according to the present exemplary embodiment is different from the display device 1 according to an exemplary embodiment of the inventive concept in that a first circuit board 300_3 does not include a lead bonding layer.

As described above, the resin film 331 of the anisotropic conductive film 330 may further include a material having an adhesive function. In this case, the anisotropic conductive film 330 may directly contact the adjacent lead wiring layer 320 and a organic protective layer 350_2 to bond the lead wiring layer 320 and the organic protective layer 350_2 to each other.

In other words, the anisotropic conductive film 330 according to the present exemplary embodiment may serve to electrically connect the signal wiring PAD and the lead wiring layer 320 in the first circuit area CA1, and simultaneously may serve to directly connect the adjacent lead wiring layer 320 and organic protective layer 350_2 in the area where the signal wiring PAD is not disposed.

Even in this exemplary embodiment of the inventive concept, the anisotropic conductive film 330 may cover the lead wiring layer 320 exposed by the organic protective layer 350_2 to protect the exposed lead wiring layer 320 from external moisture and/or corrosion promoting ions.

In other words, as described above, the organic protective layer 350_2 serving to protect the lead wiring layer 320 from external moisture and/or foreign matter is configured such that one side surface of the organic protective layer 350_2, facing one side surface of the display panel 100, is located to be spaced apart from the one side surface of the display panel 100. In this case, external moisture and/or external ions may permeate toward the first lead wiring LE1 through a space between the one side surface of the organic protective layer 350_2, facing the one side surface of the display panel 100, and the one side surface of the display panel 100.

However, in the display device 4 according to an exemplary embodiment of the inventive concept, the anisotropic conductive film 330 having a waterproof function may be disposed in a region of the first circuit board 300_3 where the first lead wiring LE1 is exposed by the organic protective layer 350_2, for example, the second sub-lead portion LE12, thus preventing external moisture and/or foreign ions from permeating into the first lead wiring LE1 through a space between the one side surface of the organic protective layer 350_2 and the one side surface of the display panel 100. Accordingly, corrosion of the first lead wiring LE1 may be prevented, and thus disconnection and/or short of the lead wirings may be prevented in advance.

Figure 19:
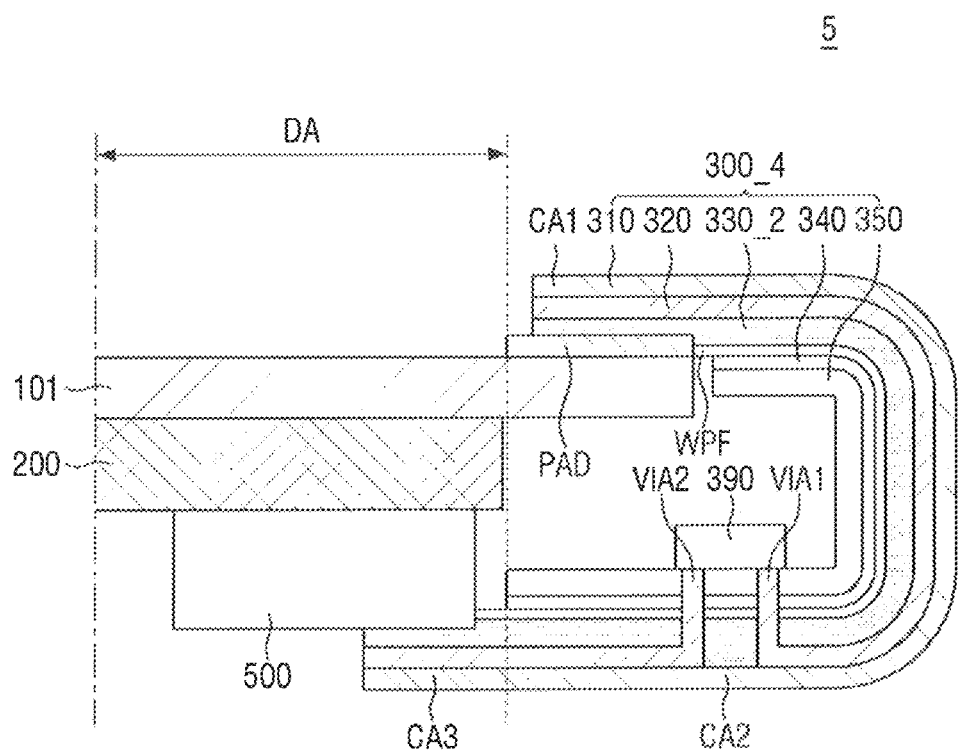
FIG. 19 is a cross-sectional view of a display device according to an exemplary embodiment of the inventive concept.

FIG. 19 is a cross-sectional view of a display device according to an exemplary embodiment of the inventive concept.

Referring to FIG. 19, a display device 5 according to the present exemplary embodiment is different from the display device 1 according to an exemplary embodiment of the inventive concept in that a waterproof member WPF is further provided between an anisotropic conductive film 330_2 and a lead bonding layer 340 of a first circuit board 300_4.

The waterproof member WPF may expose the lower surface of the anisotropic conductive film 330_2 in the first circuit area CA1 and third circuit area CA3 of the first circuit board 300_4, and may be disposed in the second circuit area CA2.

The waterproof member WPF according to the present exemplary embodiment may be a waterproof double-sided tape. The waterproof member WPF may include a substrate, a first waterproof bonding layer disposed between the substrate and the anisotropic conductive film 330_2, and a second waterproof bonding layer disposed between the substrate and the lead bonding layer 340.

The substrate may be made of polyethylene terephthalate (PET), polyimide (PI), polycarbonate (PC), polyethylene (PE), polypropylene (PP), polysulfone (PSF), polymethylmethacrylate (PMMA), triacetylcellulose (TAC), a cycloolefin polymer (COP), or the like.

Each of the first waterproof bonding layer and the second waterproof bonding layer may include an adhesive layer or a resin layer. For example, each of the first waterproof bonding layer and the second waterproof bonding layer may include a silicon-based polymer material, an urethane-based polymer material, a silicon-urethane hybrid structured SU polymer, an acryl-based polymer material, an isocyanate-based polymer material, a polyvinyl alcohol-based polymer material, a gelatin-based polymer material, a vinyl-based polymer material, a latex-based polymer material, a polyester-based polymer material, or an aqueous polyester-based polymer material.

In an exemplary embodiment of the inventive concept, the waterproof member WPF may be formed of a single adhesive layer or multiple adhesive layers. For example, the waterproof member WPF may be formed of a single coating layer including the same material as or similar material to each of the first waterproof bonding layer and the second waterproof bonding layer.

The waterproof member WPF may be disposed in a region of the first circuit board 300_4 where the first lead wiring LE1 is exposed by the organic protective layer 350 and lead bonding layer 340, for example, overlapping the second sub-lead portion LE12, thus preventing external moisture and/or external ions from permeating into the first lead wiring LE1 through a space between one side surface of the organic protective layer 350, facing one side surface of the display panel, and the one side surface of the display panel 100. Accordingly, corrosion of the first lead wiring LE1 may be prevented, and thus disconnection and/or short of the lead wirings may be prevented in advance.

Even in this exemplary embodiment of the inventive concept, the anisotropic conductive film 330_2 may cover the lead wiring layer 320 exposed by the organic protective layer 350 to protect the exposed lead wiring layer 320 from external moisture and/or corrosion promoting ions.

In other words, as described above, the organic protective layer 350 serving to protect the lead wiring layer 320 from external moisture and/or foreign matter is configured such that the one side surface of the organic protective layer 350, facing the one side surface of the display panel 100, is located to be spaced apart from the one side surface of the display panel 100. In this case, external moisture and/or external ions may permeate toward the first lead wiring LE1 through a space between the one side surface of the organic protective layer 350_2, facing the one side surface of the display panel 100, and the one side surface of the display panel 100.

However, in the display device 5 according to an exemplary embodiment of the inventive concept, the anisotropic conductive film 330_2 having a waterproof function may be disposed in a region of the first circuit board 300_4 where the first lead wiring LE1 is exposed by the organic protective layer 350, for example, the second sub-lead portion LE12, thus preventing external moisture and/or foreign ions from permeating into the first lead wiring LE1 through a space between the one side surface of the organic protective layer 350 and the one side surface of the display panel 100. Accordingly, corrosion of the first lead wiring LE1 may be prevented, and thus disconnection and/or short of the lead wirings may be prevented in advance.

As described above, exemplary embodiments of the inventive concept provide a display device capable of preventing corrosion of a lead wiring by using a printed circuit board including an anisotropic conductive film (ACF).

While the inventive concept has been shown and described with reference to exemplary embodiments thereof, it will be apparent to those of ordinary skill in the art that various modifications in form and details may be made thereto without departing from the spirit and scope of the inventive concept as set forth by the appended claims.

What is claimed is:

1. A display device, comprising:
a display panel including a display area and a pad area which is disposed around the display area and in which a plurality of signal wirings are arranged; and
a first circuit board attached to the pad area of the display panel,
wherein the first circuit board includes:
a base film;
a lead wiring layer disposed on a surface of the base film and including a plurality of first lead wirings connected to the plurality of signal wirings;
an organic protective layer disposed on the lead wiring layer and partially exposing the plurality of first lead wirings; and
an anisotropic conductive film disposed between the lead wiring layer and the organic protective layer and electrically connecting the exposed plurality of first lead wirings to the plurality of signal wirings,
wherein a first side surface of the organic protective layer, facing one side surface of the display panel, is spaced apart from the one side surface of the display panel,
wherein the anisotropic conductive film is disposed between the exposed plurality of first lead wirings and a space between the first side surface of the organic protective layer and the one side surface of the display panel, and
wherein the anisotropic conductive film includes a portion sandwiched between the lead wiring layer and the organic protective layer in a direction perpendicular to the surface of the base film.

2. The display device of claim 1,
wherein the anisotropic conductive film is in contact with the exposed plurality of first lead wirings and the plurality of signal wirings.

3. The display device of claim 2,
wherein the plurality of first lead wirings are arranged to be separated from one another, and the anisotropic conductive film is disposed between adjacent first lead wirings among the plurality of first lead wirings.

4. The display device of claim 3,
wherein the anisotropic conductive film is in contact with a side surface of the adjacent first lead wirings.

5. The display device of claim 4,
wherein the anisotropic conductive film is in contact with the base film and the display panel in an area not overlapping the plurality of first lead wirings.

6. The display device of claim 5,
wherein a thickness of the anisotropic conductive film in an area contacting the base film is greater than a thickness of the anisotropic conductive film disposed in the space between the exposed plurality of first lead wirings and the first side surface of the organic protective layer.

7. The display device of claim 4,
wherein a thickness of the anisotropic conductive film disposed between the plurality of signal wirings and the plurality of first lead wirings is smaller than a thickness of the anisotropic conductive film disposed in the space between the exposed plurality of first lead wirings and the first side surface of the organic protective layer.

8. The display device of claim 1,
wherein the first circuit board further includes a lead bonding layer disposed between the lead wiring layer and the organic protective layer, and
side surfaces of the lead bonding layer are aligned with side surfaces of the organic protective layer in a thickness direction.

9. The display device of claim 1,
wherein the organic protective layer includes a second side surface facing the first side surface, and the anisotropic conductive film includes a third side surface and a fourth side surface facing the third side surface, and
a distance between the first side surface and the second side surface of the organic protective layer is less than a distance between the third side surface and the fourth side surface of the anisotropic conductive film.

10. The display device of claim 1,
wherein the organic protective layer includes a second side surface facing the first side surface,
the anisotropic conductive film includes a third side surface and a fourth surface facing the third side surface,
the first side surface of the organic protective layer is located between the third side surface and the fourth side surface of the anisotropic conductive film, and
the second side surface of the organic protective layer is located between the fourth side surface of the anisotropic conductive film and a side surface of the first circuit board.

11. The display device of claim 1,
wherein the first circuit board further includes a driving integrated circuit disposed on the organic protective layer, and a first via hole overlapping the driving integrated circuit and penetrating the organic protective layer and the anisotropic conductive film.

12. The display device of claim 11,
wherein the driving integrated circuit is electrically connected to the plurality of first lead wirings through the first via hole.

13. The display device of claim 12,
wherein the first circuit board further includes a second via hole overlapping the driving integrated circuit in a thickness direction, penetrating the organic protective layer and the anisotropic conductive film, and spaced apart from the first via hole.

14. The display device of claim 13,
wherein the lead wiring layer further includes a plurality of second lead wirings electrically connected to the driving integrated circuit through the second via hole.

15. The display device of claim 14, further comprising:
a second circuit board attached to the first circuit board,
wherein the organic protective layer partially exposes the plurality of second lead wirings, and
the anisotropic conductive film is disposed between the exposed plurality of second lead wirings and the second circuit board to electrically connect the exposed plurality of second lead wirings to the second circuit board.

16. The display device of claim 15, further comprising:
a panel lower sheet,
wherein the first circuit board is bent in a direction opposite to a display surface of the display panel, and one end of the first circuit board and the second circuit board overlaps the panel lower sheet.

17. The display device of claim 1,
wherein the organic protective layer includes protrusion patterns disposed between adjacent first lead wirings among the plurality of first lead wirings in a plan view, and
the protrusion patterns are spaced apart from one another with the adjacent first lead wirings therebetween.

18. A printed circuit board, comprising:
a base film;
a lead wiring layer disposed on the base film and including a plurality of lead wirings;
an organic protective layer disposed on the lead wiring layer and partially exposing the plurality of lead wirings; and
an anisotropic conductive film disposed between the lead wiring layer and the organic protective layer,
wherein the organic protective layer includes a first side surface aligned with the exposed plurality of lead wirings, and a second side surface facing the first side surface,
the anisotropic conductive film includes a third side surface and a fourth side surface facing the third side surface,
a distance between the third side surface and the fourth side surface is greater than a distance between the first side surface and second side surface, and
the anisotropic conductive film covers the exposed plurality of lead wirings.

19. The printed circuit board of claim 18,
wherein the plurality of lead wirings are separated from one another, and the anisotropic conductive film is disposed between adjacent lead wirings among the plurality of lead wirings, and
the anisotropic conductive film is in contact with a side surface of the adjacent lead wirings.

20. A display device, comprising:
a display panel including a display substrate and a plurality of signal wirings;
a first circuit board including a base film, a lead wiring layer disposed on the base film, an anisotropic conductive film disposed on the lead wiring layer, and an organic protective layer disposed on the anisotropic conductive film;
a panel lower sheet disposed on the display substrate; and
a second circuit board disposed on the panel lower sheet,
wherein a first end of the anisotropic conductive film is in contact with the plurality of signal wirings and a second end of the anisotropic conductive film is in contact with the second circuit board,
wherein the anisotropic conductive film is disposed in a space between a first side surface of the organic protective layer and a side surface of the display panel, and
wherein the anisotropic conductive film is disposed in a space between a second side surface of the organic protective layer and a side surface of the second circuit board.

* * * * *